United States Patent [19]

Krueger

[11] 4,442,990
[45] Apr. 17, 1984

[54] PIPE SUPPORT DEVICE FOR PLASTIC PIPE

[76] Inventor: Guenther Krueger, 16 Bristol Ct., Berkeley Heights, N.J. 07422

[21] Appl. No.: 393,666

[22] Filed: Jun. 30, 1982

[51] Int. Cl.³ .............................................. F16L 3/22
[52] U.S. Cl. ....................................... 248/62; 248/59; 248/68.1
[58] Field of Search ............... 248/62, 68 R, 68 CB, 248/59, 58, 70, 67.5

[56] References Cited

U.S. PATENT DOCUMENTS

| | | | |
|---|---|---|---|
| 1,087,302 | 2/1914 | Kobert | 248/70 |
| 3,458,163 | 7/1969 | Egerton-Smith | 248/67.5 |
| 3,493,206 | 2/1970 | Albro | 248/59 |
| 3,633,857 | 1/1972 | Logan | 248/68 R |
| 3,854,684 | 12/1974 | Moore | 248/59 |
| 3,866,871 | 2/1975 | Dupuy | 248/59 |
| 4,270,250 | 6/1981 | Schön | 248/67.5 |
| 4,273,465 | 6/1981 | Schoen | 248/67.5 |

*Primary Examiner*—William H. Schultz
*Assistant Examiner*—Ramon O. Ramirez
*Attorney, Agent, or Firm*—William T. Hough

[57] ABSTRACT

In a preferred embodiment, the device for supporting plastic pipe provides a non-cutting smooth surface substantially linear in directions parallel to the longitudinal axis of the plastic pipe supported thereby, and includes substantially bilateral upper and lower halves of upper and lower concave seats having the non-cutting smooth surface, locked circumscribingly about the plastic pipe by spaced-apart bolts compressing together opposite clamping plates that cover and close openings in the backs of the pipe-support elements having the concave seats, and a sleeve element providing an elongated concave seat for lockably seating within a lower one of said upper and lower concave seats and providing support along an extended length of lower surface of a plastic pipe supported thereon, and mounting means attached to at least one of the clamping plates being adjustable variably to differing lengths such that height and progressing slant of a pipe line may be accomodated.

14 Claims, 5 Drawing Figures

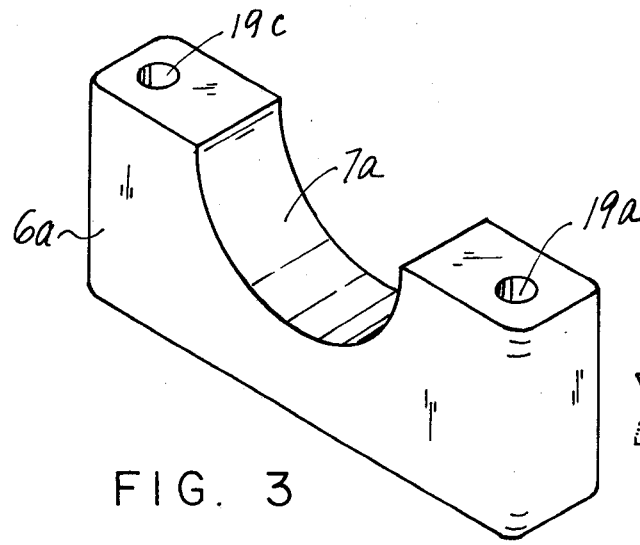
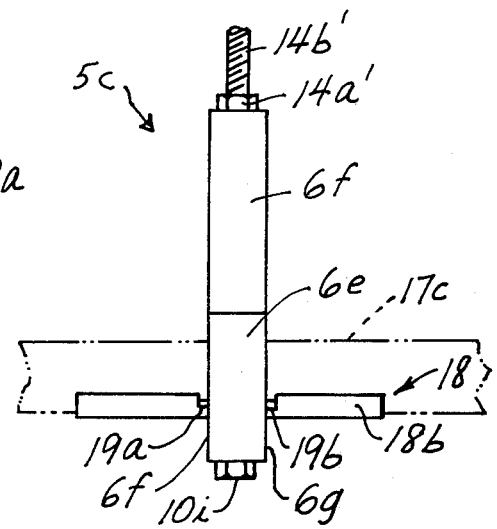
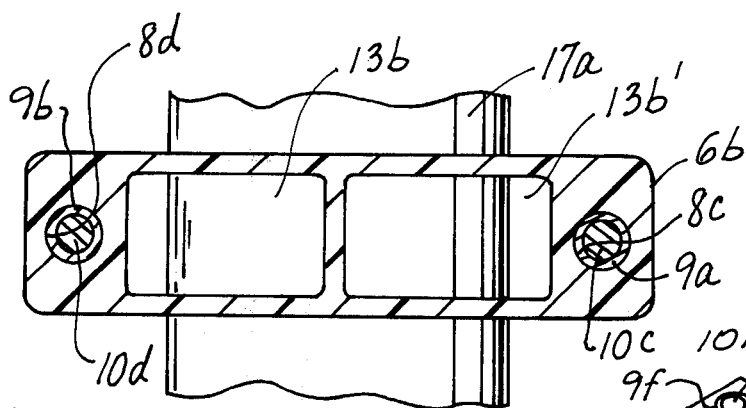
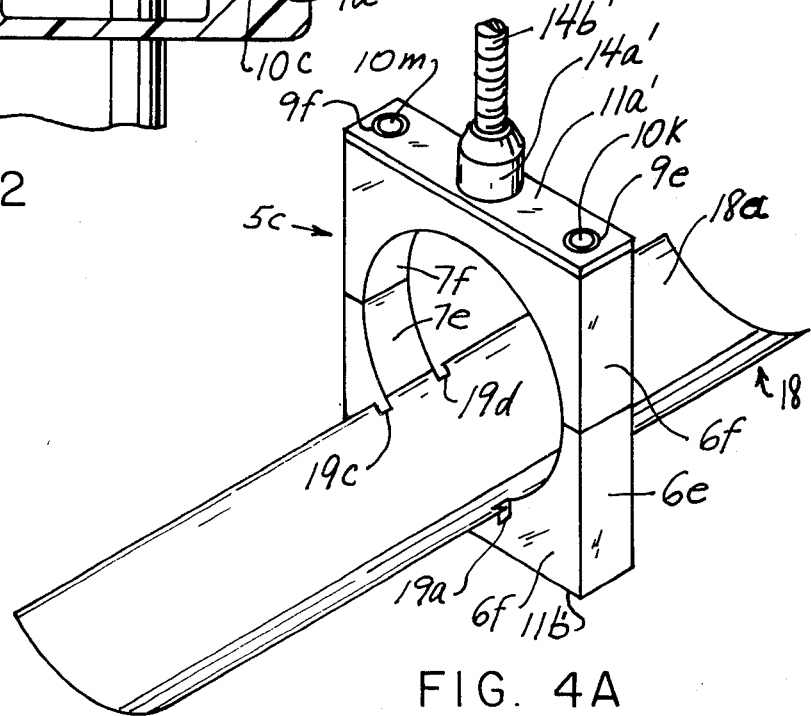

PIPE SUPPORT DEVICE FOR PLASTIC PIPE

This invention is directed to a novel device for support of plastic piping, especially of the type employed in the dairy industry.

BACKGROUND TO THE INVENTION

Prior to the present invention, a notorious problem in the commercial plastic piping industry has been the problem of providing adequate support, complicated by softness of the plastic piping resulting in sagging and each and every support tending to act as a cutting edge, particularly in industries such as the diary industry where hot liquid is passed through the pipes further thereby softening the plastic pipe. Pipe support structures have previously typically included an arrangement of serially consecutive supporting ridges extending transversely accross a length of the pipe; such supports have unified or solid body material considered essential to have adequate strength to be mounted by suspension structures, to thus hold the piping in its predesignated position and location. Typical of such a support element is that shown in the Schoen U.S. Pat. No. 4,273,465, a type of support that has been publically available for many years. Another type of support amounting to a plate-edge is shown in Dupuy, Sr. U.S. Pat. No. 3,866,871 FIG. 2 of plate A with its curved portion 16 shown in FIG. 1 thereof, that FIG. 1 showing also a hoop-like suspension element 23. U.S. Pat. No. 3,854,684 to Moore show a variety of other support elements. None of these prior art supports provide the remedy for the problems faced of the types discussed above. U.S. Pat. No. 3,856,246 is not directed to pipe supports, but discloses spacer-devices for structure used with conduit support structures, not being relevant to the present invention. In the dairy industry, filth-collectors must be avoided in selected pipe supports, while maintaining low filler(body) material.

SUMMARY OF THE INVENTION

Accordingly, objects of the present invention include the overcoming of one or more of the problems and difficulties of the types discussed above.

More particularly, objects of the invention include the obtaining of a novel support for piping of plastic, overcoming substantially heretofore problems of cutting through the plastic piping.

Another object is to obtain a strong and sturdy plastic-pipe support element.

Another object is to obtain a pipe support element utilizable with plastic pipes, devoid of filth-collecting spaces, corners, and the like, together with necessary strength, while maintaining an economically low amount of filler or body material to the support structure, as to be commercially feasible.

Another object is to extent the length of supporting structure in conjunction with one or more of the preceding objects.

Another object is to provide simplicity in structure and mounting of the pipe support structures.

Another object is to provide for accommodating necessary variations in height of support by the pipe support device, and for accomodating upward or downward slopes in the pipe, such as when gravity flow is relied on as in the dairy industry for example.

Other objects become apparent from the preceding and following disclosure.

Accordingly, one or more of the objects are obtained by the invention disclosed herein as typically illustrated in the drawings, the illustrations being intended to be examples of but not to limit the scope of the invention.

Broadly the invention may be described as a device for supporting plastic pipe providing sturdy and stable support together with a smooth non-cutting support surface substantially linear along the longitudinal axis of the pipe to be supported, and concavely arcuate forming a concave seat supportable of the arcuate exterior pipe circumscribing surface to be supported; the substantially linear axis is thus transverse to the arcuately formed body of the pipe-supporting element. Concurrently, mass or body bulk of filler material is held to a minimum by the pipe-supporting element being substantially hollow but including supporting walls extending outwardly from an opposite face from the concave seat's smooth surface, but the body of the surrounding walls including two or more spaced-apart through-apertures one on each side of the concave seat such that bolts inserted therethrough may mount and anchor the pipe-support element. Preferably snap-ins seal cavities formed by surrounding walls.

Preferably there is also employed a clamping plate having a face of sufficient surface area as to totally cover and close the opening(s) to sealably press against the surfaces of the surrounding walls to seal closed the spacious cavity thereof.

More preferably, the pipe-support element described above is used in pairs, typically as upper and lower elements, otherwise normally identical and preferably identical in all respects, as upper and lower concave seats, one plate including a threaded nut, and bolts being inserted through or from the other plate for thusly sandwiching and compressing together the opposing upper and lower pipe-support elements and their opposing upper and lower concave seats around and onto an outer circumscribing surface of a supported pipe seated within the upper and lower concave seats.

For further reducing hard edges or portions more likely to unyieldably press against and eventually cut soft plastic pipe that is often further softened by heat from hot liquid passing therethrough, the lower pipe-support element at least, and preferably both the upper and lower pipe-support support is/are preferably of essentially a plastic composition of any conventional or desired type, preferably a moldable plastic such as thermoplastic.

The upper or lower clamping plates may be welded or soldered to a support bar or other support structure. Preferably, however, there is mounted in or otherwise attached to either or both the upper and lower clamping plates suspension mechanisms for alternately attaching to a support structure or to act coordinately with another clamping plate for clamping an adjacent other sandwiched pair of opposing pipe-support elements around an additional supported pipe.

For insertion into the lower seat of a pipe-support element described above, there is preferably an elongated concave sleeve having an upper concave face for receiving and fitting closely against an outer circumscribing surface of a supported pipe supportingly, the bottom elongated surface being convex adapted to seat within and onto the concave seat of the bottom (lower) pipe-support element. More preferably, the insert has projections extending outwardly from its convex surface or face, at predetermined spaced-apart locations adapted to lightly press against opposite side faces of the lower pipe-support element holding or locking the sleeve into a stable state thus facilitating the mounting and the act of mounting and clamping the parts together around a pipe to be supported.

Together with varying needs to mount a pipe at different height, more particularly in the dairy industry for example there is employed gravity flow through the pipes thus requiring that the pipe slant downwardly. Such downward slant requires a simple and practical mechanism for achieving such slant during the mounting. Accordingly, the suspension mechanism preferably includes an extension mechanism that may be adjusted to variably increase or decrease dimensions of height of support of the pipe as supported by the opposing pipe-support elements supported between the clamping plates.

The invention may be better understood by making reference to the following illustrative Figures.

THE FIGURES

FIGS. 1 through 3 illustrate elements of a common embodiment, and FIG. 4A and FIG. 4B each illustrate a further preferred combination.

More particularly, FIG. 1 illustrates an in-part cross-sectional view taken through a preferred pipe-support device mounted around and suspendedly-mounting two separate pipes also shown in cross-section therethrough in the mounted state.

FIG. 2 illustrates a further cross-sectional view as taken along line 2—2 of FIG. 1, also showing in-part the supported pipe.

FIG. 3 illustrates in perspective view the appearance of one of either the upper or lower pipe-support element of FIG. 1, when shown isolated alone before mounting thereof, giving a good view of the concave seat having the broad and extensive flat surface against which an outer circumscribing convex surface of a plastic pipe is supportable.

FIG. 4A illustrates a single pipe-support device (combination) of the general type shown for FIG. 1, but additionally including a mounted elongated sleeve element seated in the lower pipe-support element's lower concave seat previously discussed above.

Figure 1:
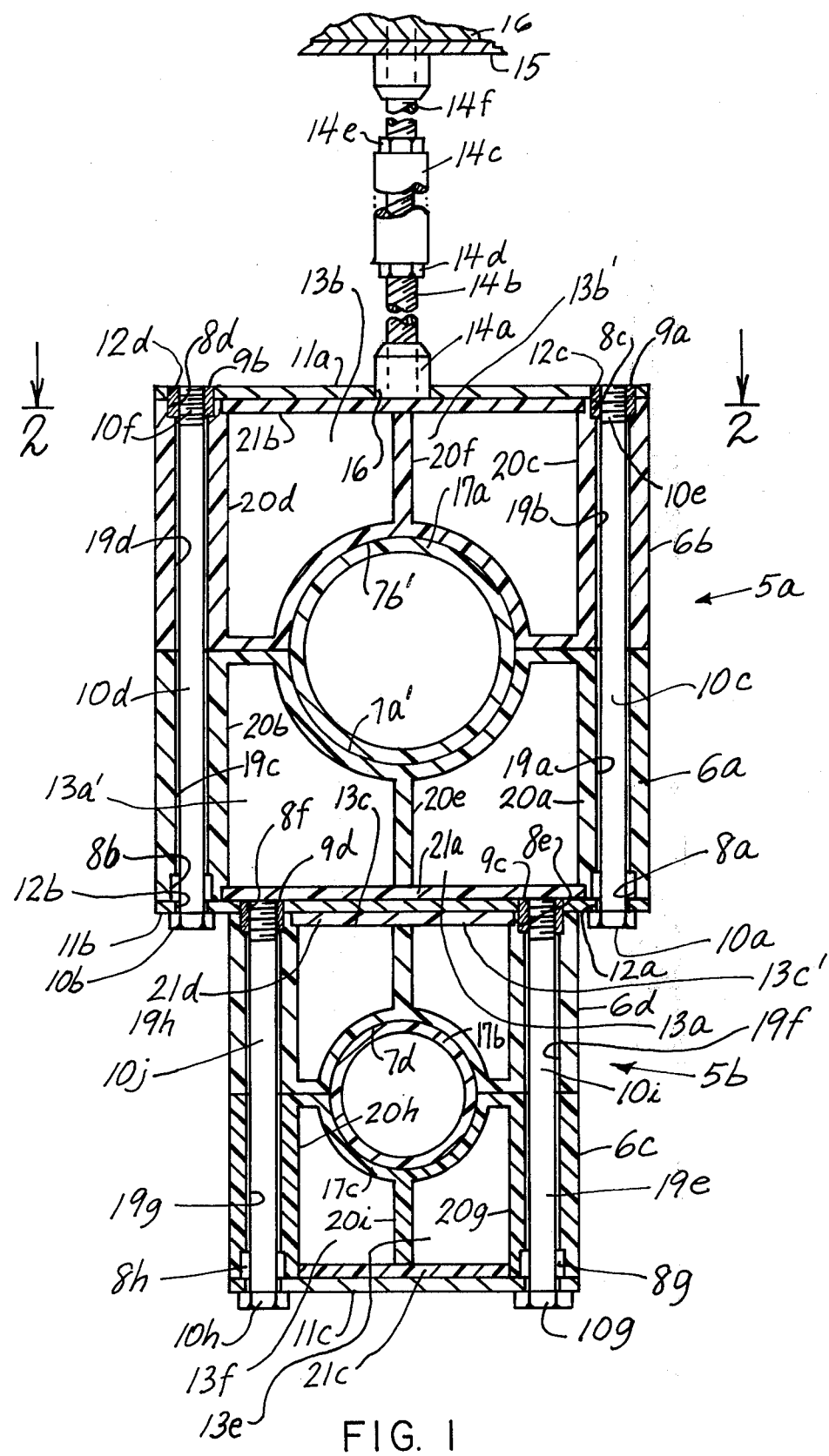

FIG. 4B further illustrates in side view the embodiment of FIG. 4A, showing the position of a pipe as it would be mounted, the pipe shown in phantom.

DETAILED DESCRIPTION OF THE INVENTION

In greater detail in the description of FIGS. 1 through 4B, the same indicia are used in different Figures when illustrating common parts or elements or the like.

First it is important to note that for plastic piping subjected to heat exposure such as by the passing of hot liquids therethrough, as a part of the present invention it has been found critical to have the platic pipe securely and stably grasped and anchored against slipping and other movement; such may be readily appreciated by those persons familiar with the sagging tendencies experienced with the use of such pipe carrying hot liquids, and with the rupture and leaking of such pipes as a result of repeated expansion and contraction while resting on and supported by prior art hard and/or cutting edges or the like. By the employment of the opposing grasping paired pipe-support elements of the present invention as described above and hereinafter, breaking or rupture or leaking of such plastic pipes has been obviated, noting that mere resting of the plastic pipe onto a concave surface will not alone overcome the problems and difficulties discussed above. However, it is also noted that the clamped state with substantially all exterior circumscribing supported pipe surfaces of a supported plastic pipe results in an evenly-distributed pressure circumscribingly of the plastic pipe, holding it in proper shape and form, as compared to a mere resting on a horizontal surface that merely exerts pressure supportingly tangentially upwardly against a single point of the pipe's circumscribing surface. Accordingly, while the broad invention is directed to a single pipe-support element as described in this disclosure having the concave and smooth supporting surface, it is the paired use thereof, and preferably the greater combinations that achieve the greater utility.

With reference to the several Figures, but particularly that embodiment of FIGS. 1, 2 and 3, there are shown coordinated clamping devices 5a and 5b, FIGS. 4A and 4B showing clamping device 5c. In the devices 5a and 5b, there are the lower concave surface 7a, 7a', and the upper concave surface 7b'. In each thereof, there are the nut-receiving cavity 8a and 8b and 8c and 8d, but solely the cavities 8c and 8d have plate-mounted nuts (female-threaded) 9a and 9b mounted therein, extending from the nut-mounting clamping plate 11a. The bolt heads 10a and 10b have bolt shafts 10c and 10d extending through through-space channels 19a, 19b, 19c and 19d and having male threads 10e and 10f screwed into the female threads of the nuts 9a and 9b, thereby clamping-together the clamping plates 11a and 11b. Thus, the clamped plated 11a and 11b sandwich therebetween and securely and stably hold the pipe-support elements 6a and 6b against and in support of the plastic pipe 17a. The clamping plates have the holes 12a, 12b, 12c and 12d, but solely the plate 11a has the nuts 9a and 9b mounted therein, the holes 12a and 12b being merely bolt-receiving holes.

The outwardly extending surrounding walls 20a, 20b, and 20c, 20d, 20e, and 20f form spacious cavities 13a, 13a', 13b, 13b' having near the tops of the surrounding walls cavinty openings closed by snap-in members 21a and 21b snapped within stepped recesses within the top portions of the surrounding walls, thereby sealably closing the spacious cavities both before mounting and during mounting and thereafter during use, maintaining sanitary conditions and eliminating the possibility of collection of or buildup of crude or other unsanitary or collected matter within these cavities. The cavities are further secured sealably by pressure of the clamped clamping plates 11a and 11b against outer surfaces of the members 21a and 21b.

The suspension female-threaded nut 14a is mounted within the clamping plate 11a, having male-threaded rod 14b screwed thereinto and thus mounting the device 5a assembly onto rod 14b; an opposite end of the male-threaded rod 14b is screwed into female threads of and thus mounted within female-threaded member 14c of which the female-threaded channel thereof is a through-channel extending its entire length, and the upper female-threaded end thereof is mounted on the male threads of the male-threaded rod 14f; the upper male-threaded end of rod 14f is mounted within female threads of a nut fused or otherwise mount onto or within mounting plate 15 that is attached conventionally or as desired, to support structure 16. By varying the extend to which the respective rods 14b and 14f are screwed into female-threaded member 14c, the relative height of mounting of the mounted pipe 17a. Once desired or needed height is achieved, the lock-nuts 14d and 14e are locked against the female-threaded member 14c.

It is to be understood that FIG. 1 may be considered either as an upright figure or an inverted one, and accordingly that the support structure 16 may be either overhead structure or alternately base or floor structure.

The FIG. 1 embodiment also shows a further-mounted supporting combination 5b, in which the clamping plate 11b serves with the clamping plate 11c and bolts 10i and 10j to clamp therebetween the pipe-support elements 6c and 6d with their concave seats 7c and 7d. Other elements thereof correspond to those already described for the FIG. 1 embodiment of combination 5a.

In the FIG. 4A illustration, the concave seats 7e (lower seat) and 7f (upper seat) show the smooth surfaces characteristic of all of the concave seats of this invention. The elements and members of the embodiment of FIGS. 4A and 4B correspond to those described for FIG. 1, except for the additional member 18 which is an elongated sleeve element having an outer arcuate surface 18b seatable within the upwardly-facing lower concave seat 7e and having an inner arcuate surface 18a seatable of a pipe 17c therealong. Cut and bent-down portions at spaced-apart predetermined locations provide the locking and positioning projections 19a, 19b, 19c and 19d that press against surfaces 6f and 6g as shown in both FIGS. 4A and 4B.

It is to be understood that the female threaded member 14c is of a long extended length, thus making possible major variations in depth to which the rods 14b and 14f are screwed thereinto, making possible major variations in height of mounting the supported pipes. Likewise, the male-threaded rods 14b and 14f are each of long extended lengths, making possible major variations in the height of the pipe being mounted.

It is within the scope of the invention to make variations and substitutions within the skill of the ordinary artisan.

While the appended claims determine the scope of the invention, it is important to further note that there are two different ways of using devices and structures of the type to which the present invention and claims thereof are directed. In particular, when the pipes to be supported are to be subjected to high pressures within, and/or to intermittent pressures as by a pump, or other equivalent situations where loose support of the pipes would result in vibration and/or eventual shaking-loose of the pipes from the supports, and/or undesirable noises associated with such vibrations, the pipe support must be of a "restraint" type and mounting, which for the present invention would mean that as disclosed in the illustrative Figures, the concave supporting surfaces 7a', 7b' 7e, 7f and 18a are close-fitting tightly and firmly against the supported and thereby restrained pipes 17a and 17b. On the other hand, particularly with plastic pipes of the types to which this invention is directed principally, for example in the pharmaceutical and dairy industries such as where flow of warm or hot liquids is by gravity flow and where the heat of expansion affecting these plastic pipes as the hot liquids flow therethrough, the fit must be a loose fit—the support structure being not for restraint, but being for suspension and guidance generally and accomodating thereby the expansion and contraction of the pipes during periods of heating and cooling alternately. Thus, while the Figures do not illustrative mere suspension of a pipe having smaller outside diameter than the circumscribing inner diameter of the clamped-together concave support surfaces, such are clearly contemplated as a part of the use and scope for and of the present invention.

I claim:

1. A support device for supporting a plastic pipe in a substantially horizontal position, comprising in combination: a pipe-support element having a pipe-supporting smooth surface extending substantially linearly in direction transverse to the pipe-support element substantially parallel with a longitudinal axis of pipe to be supported thereon, and extending arcuately and concavely forming a concave seat for a pipe to be supported thereon, and body material having said pipe-supporting surface being formed as a wall having an opposite surface and extending into surrounding walls substantially outwardly-extending from edges of said opposite surface forming at least one spacious cavity having at least one outer-spaced opening thereto formed by said surrounding walls, and said surrounding walls having at least two spaced-apart through-apertures one on each of opposite-locations relative to said concave seat, receivable of a bolt element for locking the pipe-support element into a predetermined position on a support structure.

2. A support device of claim 1, including a clamping plate of sufficient area on its clamping face to totally cover said spacious cavity and said outer-spaced opening thereto and to seat sealably against said surrounding walls, said clamping plate having at least two other spaced-apart through-holes alignable with said at least two spaced-apart through apertures and being lockable onto said pipe-support element when said bolt element is mounted one through each pair of aligned through-aperture and through hole.

3. A support device of claim 2, including two of each of said pipe-support element and said clamping plate, positionable with said concave seat of each element in opposite and opposing relationship to the other, and one of said clamping plate mounted on one of the pipe-support elements and the remaining other said clamping plate mounted on the remaining other pipe-support element, and including said two bolt elements mounted within said spaced-apart through-apertures and through-holes locking said opposing pipe-support elements into opposing and pipe-supporting relationship supportable of pipe extending through a channel formed by the opposing concave seats of the two pipe-support elements.

4. A pipe support device of claim 3, including an elongated sleeve element having an outer arcuate surface seatable within an upwardly-facing one of said concave seats and having an inner arcuate surface seatable of a pipe therealong.

5. A pipe support device of claim 3, including a suspension means mounted on an upper one of the two clamping plates adapted for mounting and suspending the upper one of the two clamping plates onto a support structure.

6. A pipe support device of claim 5, including other suspension means on a lower one of the two clamping plates adapted for mounting and suspending an additional pipe-support element onto the lower one of the two clamping plates.

7. A pipe support device of claim 3, including suspension means mounted on one of the two clamping plates adapted for mounting and suspending said one clamping plate onto support structure.

8. A pipe support device of claim 7, including other suspension means on a remaining one of the two clamping plates adapted for mounting and suspending an additional pipe-support element onto the said remaining one of the two clamping plates.

9. A pipe support device of claim 1, in which said pipe-support element consists essentially of plastic.

10. A pipe support device of claim 3, in which each of said pipe-support elements consists essentially of plastic.

11. A pipe support device of claim 4, in which the arcuate surface of the elongated sleeve element is in the form of an elongated concave seat, and spaced-apart projections therefrom provide locking structures lockable against opposite faces of the pipe-support element retainable of the elongated sleeve onto its lower concave seat.

12. A pipe support device of claim 8, in which said suspension means includes extension means for variably increasing or decreasing dimensions of height of support of a pipe.

13. A pipe support device of claim 10, including a cavity-opening sealing member, sealably fitting within upper side surfaces of said surrounding walls at and within said outer-spaced opening.

14. A pipe support device of claim 1, including a cavity-opening sealing member, sealably fitting within upper side surfaces of said surrounding walls at and within said outer-spaced opening.

* * * * *